F. TWYMAN & A. GREEN.
METHOD AND APPARATUS FOR FINISHING PRISMS OR LENSES OR COMBINATIONS OF THE SAME.
APPLICATION FILED DEC. 12, 1916.

1,252,512.

Patented Jan. 8, 1918.
2 SHEETS—SHEET 1.

Inventors
Frank Twyman and
Alfred Green
By their Attorneys

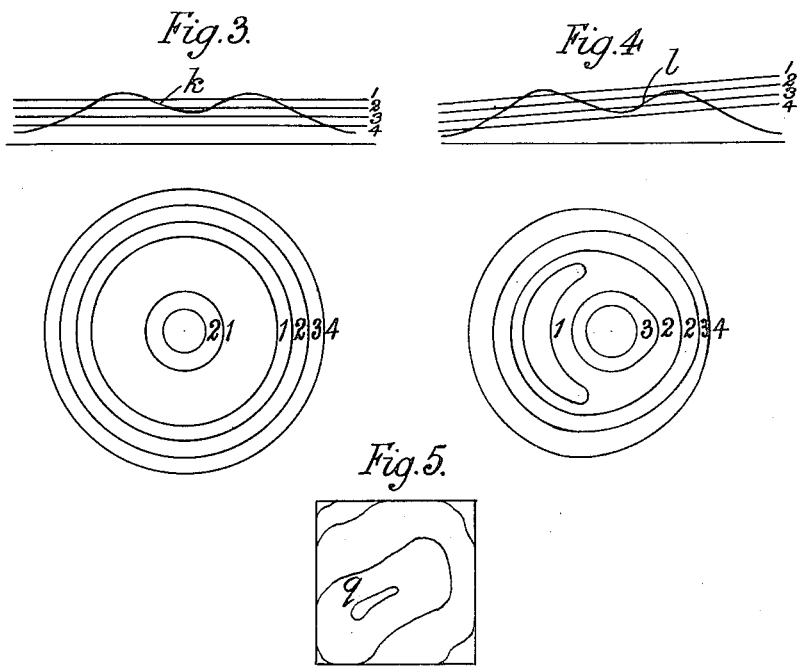

UNITED STATES PATENT OFFICE.

FRANK TWYMAN AND ALFRED GREEN, OF LONDON, ENGLAND, ASSIGNORS TO ADAM HILGER, LIMITED, OF LONDON, ENGLAND.

METHOD AND APPARATUS FOR FINISHING PRISMS OR LENSES OR COMBINATIONS OF THE SAME.

1,252,512.   Specification of Letters Patent.   Patented Jan. 8, 1918.

Application filed December 12, 1916. Serial No. 136,504.

*To all whom it may concern:*

Be it known that we, FRANK TWYMAN and ALFRED GREEN, subjects of the King of Great Britain, both residing at 75ª Camden road, London, England, have invented new and useful Improvements in Methods and Apparatus for Finishing Prisms or Lenses or Combinations of the Same, of which the following is a specification.

This invention relates to improvements in the manufacture of prisms and lenses or combinations of lenses or prisms, or both, designated for the purposes of this specification as an optical element.

The object of this invention is to provide a simple and accurate method of, and apparatus for locating and correcting imperfections in an optical element which may be due to either faults of workmanship, faults such as residual spherical aberration of lenses which cannot be removed by computation and faults due to the want of homogeneity in the glass or other substance of which the optical element is made.

According to this invention a beam of light is passed through the optical element in such a way as to produce a series of interference rings which arrange themselves into what may be called a "contour map" of the imperfections. The workman preferably draws this map upon the surface under treatment and then removes the superfluous material from the prominences in the ordinary manner.

The instrument for producing the contour map resembles a well known form of interferometer in that a beam of light is divided into two parts, one passing (and preferably twice passing) through the optical element and being then recombined with the other part. The instrument, however, differs from interferometers of the above type in that both parts of the beam are brought to a focus at the eye of the observer.

The expression "contour map" is only strictly accurate if the material of which the optical elements are made is homogeneous, for the want of homegeneity in the material produces similar results to inequalities in the surface, but in practice the map is truly a contour map of the imperfections for any portion of the surface which appears in the map as a prominence must be lowered whether the prominence actually exists or not.

The optical elements may be divided into two categories. In the one category are classed those combinations which are required to receive a parallel beam of light (that is a beam of light which has a plane wave surface) and deliver it after transmission as a parallel beam, and in the other are those combinations the desired result of which is to impart a curvature or curvatures to a beam of light which is incident on them as a parallel beam, or to alter the curvature or curvatures of a beam which has already a curved wave front or incidence on the optical combination.

In the case of either class of combinations the combination which it is required to finish is placed in one beam of an interferometer of the kind which divides an incident beam of light (which, originating in what is substantially a point source, is usually but not always collimated to produce a parallel beam of light) into two parts by means of a partially reflecting plane surface, the two parts being subsequently recombined under conditions which produce the phenomena of interference of light.

Means are provided to insure that the paths of the rays through the optical element are substantially such as if the optical element were in actual use. The rays, however, may pass through the element in the reverse sense, provided only that the paths of the rays are the same as in actual use. In the part of the beam which does not pass through the element may be placed a similar element (which may be called the balancing element) known to be good in quality, or alternatively the balancing element may be some other optical element whose effect is substantially the same or in a known way different from that desired to be produced.

The recombined beam may pass through the element or the balancing element, or both, either after single or double transmission.

The beam resulting from the recombining of the two parts of the beam is made to converge in such a way that rays which pass through the element as in actual use are focused to a point at which the eye of the workman is placed.

The light used should consist of a limited number of homogeneous radiations: such a light may be obtained from a Cooper-Hewitt mercury vapor lamp.

When the light is very pure and the adjustment of the apparatus is such as to secure perfect recombination of the two parts of the beam, the workman sees the surface of the optical element and light and dark interference fringes apparently on the surface of the same. In some cases these fringes are only present as differences of shade or as patchy distribution of illumination.

If any one of these fringes be taken as a point of reference the fringes next it on either side indicate that the optical path of the ray coming from that part of the optical element is in the one case less by one wave length and in the other case greater by one wave length relatively to the ray from the point of reference and in comparison with the corresponding rays from the balancing element. By varying the adjustment of the apparatus such a disposition of fringes is obtained by the workman as is desirable (i. e., as will result in the most ready correction of the optical element), and any desired surface of the element can then be mapped out by him, either by making a sketch or by actually marking the surface, so as to present a record of those parts of that surface at which the rays passing through the element have the shortest paths and those parts at which the rays have longer paths, together with the amounts in wave lengths by which the paths are too long.

The workman then polishes away the glass or other material from those portions of the surface corresponding to the longer paths. Re-observing and working again in this way he eventually produces such a surface as perfectly corrects the inequalities of the paths of the rays originally existing in the optical element.

The drawings show diagrammatically two forms of apparatus which may be used in carrying out this invention.

In our application for patent Serial No. 203,187 filed Nov. 21, 1917, we claim specifically the form of apparatus disclosed in Figure 2 of the accompanying drawings, which figure shows a curved groove construction in which a projection on the carriage carrying a mirror is adapted to slide.

Figs. 3 and 4 show contour lines, and Fig. 5 is a contour map.

Figure 1:
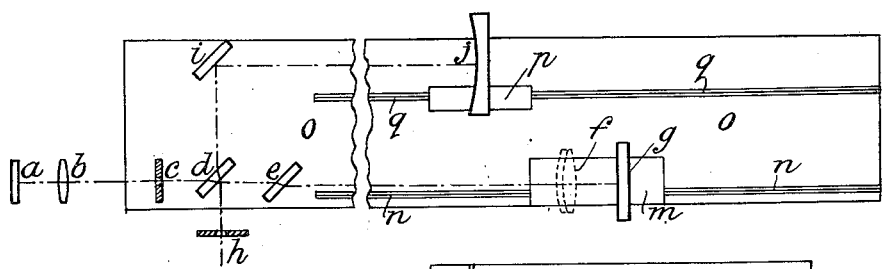
Fig. 1 is a plan of an apparatus suitable for the correction of such optical elements as are required to impart a curvature to a beam which is incident on them as a parallel beam.

Light from a suitable source is reflected toward the apparatus by the mirror $a$ and is condensed by a lens $b$ on to the aperture in the diaphragm $c$ through which it passes to the plane parallel glass plate $d$. The second surface of this glass plate is partially silvered so that a part of the light is reflected and a part transmitted by it.

The transmitted portion passes through a parallel plate $e$ (whose function is to compensate for the effect on the reflected portion of the light of the thickness of the glass of the plate $d$) and thence to an achromatic object glass $f$ which is in this instance the optical element to be corrected.

The position of the object glass $f$ is so arranged that the rays from a point in the plane of the diaphragm $c$ are after passage through it nearly parallel, and that side of the object glass is toward the parallel light as is the case in actual use.

The light is reflected back by the mirror $g$ and after traversing the object glass $f$ and the compensating plate $e$ is partly reflected toward a diaphragm $h$ on the aperture of which it forms an image of the aperture in the diaphragm $c$.

The other part of the beam which is reflected from the second surface of the plate $d$ passes to a mirror $i$ whence it is reflected to a concave mirror $j$ (which in this case has a true spherical shape, i. e., a surface which has already been tested) so disposed that the beam when reflected back recombines at the second surface of the plate $d$ with the first mentioned part of the beam and proceeds with the latter to form at the aperture of the diaphragm $h$ an image of the aperture of the diaphragm $c$. Both the diaphragms $h$ and $c$ are optically at the center of curvature of the mirror $j$.

The coincidence of the two images may be observed through an eyepiece thus allowing any necessary adjustments of the mirrors $i$ and $j$ to be made.

Then on placing the eye at the aperture in the diaphragm $h$ the interference fringes can be seen apparently on the surface of the object glass.

In a perfect object glass a beam from a point source should have a plane wave front after passage through it (or vice versa) and therefore should have a truly spherical wave front after passage through the object glass, after reflection at a plane mirror and after passage through the object glass for a second time in the reverse direction.

If this is not the case, suppose the wave front immediately after double passage through the object glass differs from a truly spherical surface in any particular axial section by amounts proportional to the ordinates of the curves $k$ and $l$ shown in Fig. 3 and Fig. 4.

Now the wave front in the case of most object glasses approximates very closely to a surface of revolution, and it will simplify the presentation of the characteristic appearances if we consider it to be so in the case under consideration.

Let the parallel planes 1, 2, 3, 4 . . . represent to the same scale successive wave lengths of the light used.

Then the interference fringes seen by the eye will be contour lines produced by the intersection of the planes 1, 2, 3, 4 . . . and the surface of revolution shown by the curves $k$ and $l$ (Figs. 3 and 4).

It will readily be seen that it is possible to produce a variety of arrangements of the fringes by slightly tilting the mirror $j$ through small angles as is shown in Fig. 4, but all the systems represent contour lines of the character described.

The effect of removing from any glass surface which transmits light of a slight thickness of its substance is to alter the equivalent path in air of the transmitted ray by an amount approximately proportional to the thickness removed.

It will thus be seen that the interference pattern seen on the apparatus is a contour map on a scale of the wave lengths of light of the amount of glass requiring to be removed from each part of any desired surface of the object glass to make its optical performance perfect.

The removal of the glass is effected by means of small polishers of wax, pitch, cloth or felt of a size appropriate to the particular disposition of the fringes, and the polishing materials used are any of those ordinarily employed in optical glass polishing.

The object glass $f$ and mirror $g$ are supported in a carriage $m$ having on its underside projections which enter a groove $n$ in the table $o$. Similarly the mirror $j$ is supported in a carriage $p$ having projections which enter a groove $q$.

Figure 2:
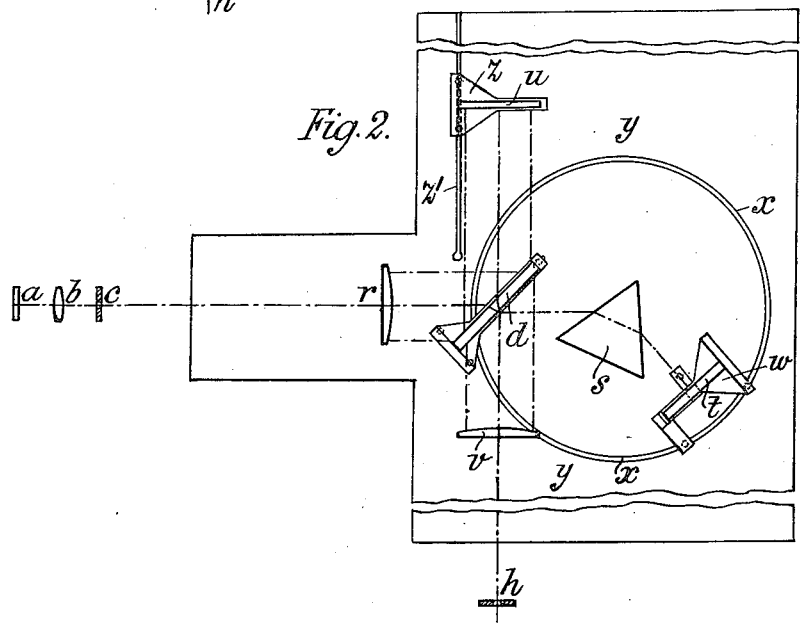
Fig. 2 is a plan of an apparatus suitable for the correction of optical elements which, receiving a plane beam of light, are required to deliver it after transmission as plane. In the case shown the optical element is a 60° prism such as is used for spectrum work.

Similarly in Fig. 2 light from a suitable source is reflected by the mirror $a$ through a condensing lens $b$ on to the aperture of a diaphragm $c$.

The diverging beam of light is collimated by a lens $r$ and falls as a parallel beam on a plane parallel plate $d$, the second surface of which is partially silvered so that a part of the light is transmitted and a part reflected by it. One part passes through a 60° prism $s$ being refracted through it in the same way as in actual use and being reflected by the mirror $t$ passes back through the prism to the plate $d$. The other part is reflected to the mirror $u$ and back again to the plate $d$ where the parts recombine and pass through a lens $v$ by which each is focused to form an image at the aperture of the diaphragm $h$.

The mirrors are adjusted to give coincidence of these two images, and the eye then being placed at the aperture in the diaphragm $h$ interference fringes are seen which represent what may be called a contour map, as illustrated in Fig. 5, of the glass requiring to be removed from each part of either prism face in order to make its performance perfect.

These lines can be marked out on the surface of the prism and the portions of the glass which are superfluous are removed by polishing as in the case of the object glass.

A good method of treating a prism giving the map shown in Fig. 5 would be, first to polish on the region $q$ (at which the prism acts as if it were too thick), then to extend the area of polish to the next contour line, then to the next, and so on.

The mirror $t$ is supported in a carriage $w$ having projections on its underside entering a circular groove $x$ in the table $y$, and the mirror $u$ is supported in a carriage $z$ having projections on its underside entering a groove $z'$.

If the function of the optical combination to be finished is to alter the curvature of a beam which already has a curved wave front, then instead of the plane mirror $g$ (Fig. 1) a suitable concave or convex mirror should be used of such a curvature, and so disposed that the rays pass through the optical combination in both directions substantially along the same paths as they will traverse in actual use. The mirror should be placed with its center of curvature situated at the point conjugate to the source of light with respect to the optical combination under test.

In the case of either class of elements, in order to ascertain whether any particular portion of the surface is in effect a protuberance or a depression, one may insert into the path of the beam which passes through the element, the workman's warm finger, a warm rod or a rod dipped in methylated spirits, benzin or other volatile liquid. In the case of the warm finger or warm rod, the heating of the air in its neighborhood causes a reduction of the optical density of the air and in the case of the rod dipped in volatile liquid the effect is to increase the density of the air in the neighborhood of the rod. In the former case the effect of the warm object so placed in the beam is to extend a depression in its neighborhood and in the case of the latter classes of objects the effect is to reduce the depression.

What we claim is:

1. The method of manufacturing optical elements, which consists in dividing a beam of light into two parts, passing one part to a tested surface, passing the other part through the optical element, recombining the two parts, causing the resulting beam to converge to a focus to produce interference fringes, and then manually making a contour map of the imperfections in the optical element as shown by said fringes.

2. The method of manufacturing optical elements, which consists in dividing a beam of light into two parts, passing one part onto a tested surface, passing the other part through the optical element, then recombining the two parts, causing the resulting beam to converge to a focus to produce interference fringes indicative of imperfections in the optical element, making a contour map of said imperfections and then treating the optical element to remove the imperfections.

3. The method of manufacturing optical elements, which consists in dividing a beam of light into two parts, passing one part to a tested surface, passing the other part through the optical element, recombining the two parts, causing the resulting beam to converge to a focus to produce interference fringes, rarefying the air adjacent the optical element to test the nature of the imperfections, and then making a contour map of said imperfections in the optical element as shown by the interference fringes.

4. The method of manufacturing optical elements which consists in dividing a beam of light into two parts, passing one part to a tested surface, passing the other part through the optical element, recombining the two parts, causing the resulting beam to converge to a focus to produce interference fringes, changing the density of the air adjacent the optical element to test the nature of the imperfections, and then making a contour map of said imperfections in the optical element as shown by said fringes.

5. The method of manufacturing optical elements, which consists in dividing a beam of light into two parts, passing one part onto an outside surface, passing the other part through the optical element, then recombining the two parts, causing the resulting beam to converge to a focus to produce interference fringes indicative of imperfections in the optical element, making a contour map of said imperfections on the optical element, and then treating said element to remove the imperfections.

6. An apparatus for finishing optical elements comprising a plane parallel glass plate partially silvered and adapted to reflect part of a beam of light and to transmit a part, two mirrors adapted to reflect the light back to the plate and mounted so that their distances from the plate can be varied, and means for maintaining the optical element to be finished in the path of light to and from one of said mirrors.

7. An apparatus for finishing optical elements comprising a plane parallel glass plate partially silvered and adapted to reflect part of a beam of light and to transmit a part, two mirrors adapted to reflect the light back to the plate, means for bringing both parts of the beam to a focus, and means for maintaining the optical element to be finished in the path of light to and from one of said mirrors.

8. An apparatus for finishing optical elements comprising a plane parallel glass plate partially silvered and adapted to reflect part of a beam of light and to transmit a part, a mirror mounted on a carriage, a groove, a projection on the carriage adapted to slide in the groove, another mirror mounted on another carriage, a groove, a projection on the carriage adapted to slide in the groove, and means on the second carriage for holding an optical element.

9. An apparatus for finishing optical elements comprising a plane parallel glass plate partially silvered and adapted to reflect part of a beam of light and transmit a part, a mirror adapted to reflect light from the plate to a mirror mounted on a carriage, a groove, a projection on the carriage adapted to slide in the groove, another mirror mounted on another carriage, a groove, a projection on the carriage adapted to slide in the groove, and means on the second carriage for holding an optical element.

10. An apparatus for finishing optical elements comprising a plane parallel glass plate partially silvered and adapted to reflect part of a beam of light and transmit a part, a mirror mounted on a carriage, a projection on the carriage adapted to slide in a straight groove, another mirror mounted on another carriage, a projection on the carriage adapted to slide in a groove, and means for holding an optical element in coöperative position with the mirror on the second carriage.

11. An apparatus for finishing optical elements, comprising a member adapted to transmit part of a beam of light and reflect a part, a tested optical surface disposed in the path of the reflected light and adapted to reflect the same back to said member, means for reflecting the transmitted light back to said member, and means for maintaining the optical element to be finished in the path of said transmitted light.

12. An apparatus for finishing optical elements, comprising a member adapted to transmit part of a beam of light and reflect a part, a tested optical surface disposed in the path of the reflected light and adapted to reflect the same back to said member, means for reflecting the transmitted light back to said member, means for maintaining the optical element to be finished in the path of said transmitted light, and means for bringing both parts of the beam to focus.

FRANK TWYMAN.
ALFRED GREEN.